(12) United States Patent
Tan et al.

(10) Patent No.: US 10,147,367 B2
(45) Date of Patent: Dec. 4, 2018

(54) MEMORY IN PIXEL, DATA STORAGE METHOD IN PIXEL AND PIXEL ARRAY

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Wen Tan, Beijing (CN); Jia Chen, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/561,886

(22) PCT Filed: Apr. 1, 2017

(86) PCT No.: PCT/CN2017/079288
§ 371 (c)(1),
(2) Date: Sep. 26, 2017

(87) PCT Pub. No.: WO2017/197992
PCT Pub. Date: Nov. 23, 2017

(65) Prior Publication Data
US 2018/0211615 A1    Jul. 26, 2018

(30) Foreign Application Priority Data
May 18, 2016    (CN) .......................... 2016 1 0330824

(51) Int. Cl.
*G09G 3/36*    (2006.01)
*G02F 1/1343*    (2006.01)
*G02F 1/133*    (2006.01)

(52) U.S. Cl.
CPC ............. *G09G 3/36* (2013.01); *G02F 1/1343* (2013.01); *G02F 1/13306* (2013.01); *G09G 2310/0264* (2013.01)

(58) Field of Classification Search
CPC ....................................................... G09G 3/36
See application file for complete search history.

(56) References Cited

U.S. PATENT DOCUMENTS 5,712,652 A * 1/1998 Sato ..................... G06F 3/03542
345/204
5,945,972 A * 8/1999 Okumura ............. G09G 3/3648
345/100

(Continued)

FOREIGN PATENT DOCUMENTS

CN    101441384 A    5/2009
CN    101996576 A    3/2011

(Continued)

OTHER PUBLICATIONS

The First Chinese Office Action dated May 2, 2017; Appln. 201610330824.4.

(Continued)

*Primary Examiner* — William Boddie
*Assistant Examiner* — Andrew Schnirel
(74) *Attorney, Agent, or Firm* — Ladas & Parry LLP

(57) ABSTRACT

A memory in pixel, a data storage method, and a pixel array. The memory in pixel includes a data input unit, configured to read data voltage on a data line onto a first data latching terminal and a second data latching terminal; a first data latching circuit, configured to hold a level of the first data latching terminal; a second data latching circuit, configured to hold a level of the second data latching terminal; a drive control circuit, configured to enable a level of a drive node to be opposite to that of the first data latching terminal; and a drive circuit, configured to output a third power source (Continued)

voltage of a third power source voltage terminal to a output terminal and output a fourth power source voltage of a fourth power source voltage terminal to the output terminal.

17 Claims, 10 Drawing Sheets

(56) References Cited

U.S. PATENT DOCUMENTS

| | | | |
|---|---|---|---|
| 6,310,813 B1 | 10/2001 | Bae | |
| 6,771,247 B2* | 8/2004 | Sato | G09G 3/3659 345/90 |
| 2002/0041266 A1* | 4/2002 | Koyama | G09G 3/3648 345/87 |
| 2007/0159417 A1* | 7/2007 | Miyake | G09G 3/3258 345/76 |
| 2014/0015866 A1* | 1/2014 | Teranishi | G09G 3/2007 345/690 |
| 2017/0179168 A1* | 6/2017 | Suzuki | G02F 1/133553 |
| 2018/0114497 A1* | 4/2018 | Tan | G09G 3/3651 |

FOREIGN PATENT DOCUMENTS

| | | |
|---|---|---|
| CN | 104200789 A | 12/2014 |
| CN | 106297686 A | 1/2017 |
| JP | 2009-086402 A | 4/2009 |

OTHER PUBLICATIONS

International Search Report and Written Opinion dated Jun. 28, 2017; PCT/CN2017/079288.

* cited by examiner

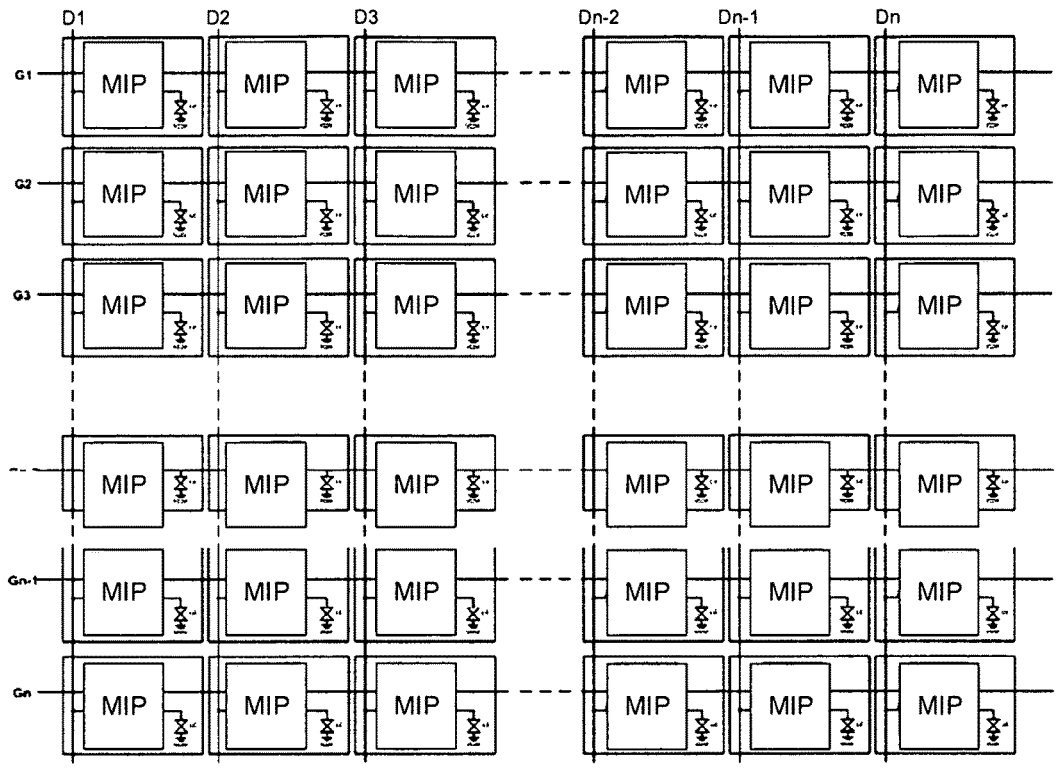

FIG. 4

S510 — In a first time period, the data input circuit reads the data voltage on the data line onto the first data latching terminal and the second data latching terminal, the level of the drive node is opposite to that of the first data latching terminal, and the level of the output terminal of the drive circuit is opposite to that of the data voltage S520 — In a second time period, the data input circuit isolates the data line from the first data latching terminal and the second data latching terminal, the first data latching circuit holds a level of the first data latching terminal, and the second data latching circuit holds a level of the second data latching terminal, such that the level of the output terminal of the drive circuit is held to be unchanged

FIG. 5

MEMORY IN PIXEL, DATA STORAGE METHOD IN PIXEL AND PIXEL ARRAY

TECHNICAL FIELD

The present disclosure relates to storage of a data voltage in a pixel, and more particularly, to a memory in pixel, a data storage method in pixel and a pixel array.

BACKGROUND

Currently, with development of technologies such as intelligent wearing, mobile application, etc., higher requirements are aroused on the development of an ultralow-power consumption LCD technology. A Memory in Pixel (MIP) display technology as a novel low-power consumption LCD technology has broad development prospect due to characteristics of no need to change an LCD process, no need to develop novel materials, simple structure, low cost and the like.

However, the current MIP display technology is basically a CMOS LTPS process, the MIPs in the MIP display technology are all formed by a CMOS circuit, such process is complex and is lower in yield, which greatly increases a product cost of the MIP display technology and limits technological compatibility and an application range of the MIP display technology.

Therefore, there is a need for an MIP based on a simple process and a data storage method.

SUMMARY

According to one aspect of the present disclosure, there is provided an MIP, comprising a data input unit, connected to a data line (DATA), a first control signal terminal (S1), a first data latching terminal (IN1) and a second data latching terminal (IN2), and configured to read data voltage (Vdata) on the data line onto the first data latching terminal (IN1) and the second data latching terminal (IN2) when a first control signal of the first control signal terminal is at its effective level; a first data latching circuit, connected to the first data latching terminal (IN1) and configured to hold a level of the first data latching terminal (IN1); a second data latching circuit, connected to the second data latching terminal (IN2) and configured to hold a level of the second data latching terminal (IN2); a drive control circuit, connected to the first data latching terminal (IN1) and a drive node (M) and configured to enable a level of the drive node (M) to be opposite to that of the first data latching terminal (IN1); and a drive circuit, connected to the drive node (M), the second data latching terminal (IN2) and an output terminal (OUT), and configured to output a third power source voltage of a third power source voltage terminal to the output terminal (OUT) when the drive node (M) is at its effective level and output a fourth power source voltage of a fourth power source voltage terminal to the output terminal (OUT) when the second data latching terminal (IN2) is at its effective level.

According to an embodiment of the present disclosure, the first data latching circuit is further connected to the drive node (M) and a second control signal terminal (S2) and configured to enable the level of the first data latching terminal (IN1) to be opposite to that of the drive node (M) when the second control signal terminal (S2) is at its effective level; and the second data latching circuit is further connected to the output terminal (OUT) and the second control signal terminal (S2) and configured to enable the level of the second data latching terminal (IN2) to be opposite to that of the output terminal (OUT) when the second control signal terminal (S2) is at its effective level.

According to an embodiment of the present disclosure, the first data latching circuit includes: a first holding transistor (T10), having a gate electrode connected to the second control signal terminal (S2), a first electrode connected to the first data latching terminal (IN1) and a second electrode connected to a first node (N); a first control transistor (T8) of the first node, having a gate electrode and a first electrode connected to a first power source voltage terminal, and a second electrode connected to the first node (N); and a second control transistor (T9) of the first node, having a gate electrode connected to the drive node (M), a first electrode connected to the first node (N), and a second electrode connected to a second power source voltage terminal.

According to an embodiment of the present disclosure, the second data latching circuit includes: a second holding transistor (T5), having a gate electrode connected to the second control signal terminal (S2), a first electrode connected to the second data latching terminal (IN2) and a second electrode connected to a second node (Q); a first control transistor (T3) of the second node, having a gate electrode and a first electrode connected to the third power source voltage terminal, and a second electrode connected to the second node (Q); and a second control transistor (T4) of the second node, having a gate electrode connected to the output terminal (OUT), a first electrode connected to the second node (Q), and a second electrode connected to the fourth power source voltage terminal.

According to an embodiment of the present disclosure, the second data latching circuit is further connected to the first node (N) and the second data latching circuit includes: a second holding transistor (T5), having a gate electrode connected to the second control signal terminal (S2), a first electrode connected to the second data latching terminal (IN2) and a second electrode connected to a second node (Q); a first control transistor (T3) of the second node, having a gate electrode connected to the first node (N), a first electrode connected to the third power source voltage terminal, and a second electrode connected to the second node (Q); and a second control transistor (T4) of the second node, having a gate electrode connected to the output terminal (OUT), a first electrode connected to the second node (Q), and a second electrode connected to the fourth power source voltage terminal.

According to an embodiment of the present disclosure, the data input circuit includes: a first input transistor (T11), having a gate electrode connected to the first control signal terminal (S1), a first electrode connected to the data line (DATA) and a second electrode connected to the first data latching terminal (IN1); and a second input transistor (T12), a gate electrode connected to the first control signal terminal (S1), a first electrode connected to the data line (DATA) and a second electrode connected to the second data latching terminal (IN2).

According to an embodiment of the present disclosure, the drive control circuit includes a first drive control transistor (T6), having a gate electrode and a first electrode connected to the first power source voltage terminal, and a second electrode connected to the drive node (M); and a second drive control transistor (T7), having a gate electrode connected to the first data latching terminal (IN1), a first electrode connected to the drive node (M), and a second electrode connected to the second power source voltage terminal.

According to an embodiment of the present disclosure, the drive circuit includes: a first drive transistor (T1), having a gate electrode connected to the drive node (M), a first electrode connected to the third power source voltage terminal, and a second electrode connected to the output terminal (OUT); and a second drive transistor (T2), having a gate electrode connected to the second data latching terminal (IN2), a first electrode connected to the output terminal (OUT), and a second electrode connected to the fourth power source voltage terminal.

According to an embodiment of the present disclosure, each transistor is an NMOS transistor, an effective level of the drive node (M) is a high level, the first power source voltage terminal is a first high power source voltage terminal (VDD), the second power source voltage terminal is a first low power source voltage terminal (VSS), the third power source voltage terminal is a second high power source voltage terminal (VDH) and the fourth power source voltage terminal is a second low power source voltage terminal (VDL).

According to an embodiment of the present disclosure, each transistor is a PMOS transistor, an effective level of the drive node (M) is a low level, the first power source voltage terminal is a first low power source voltage terminal (VSS), the second power source voltage terminal is a first high power source voltage terminal (VDD), the third power source voltage terminal is a second low power source voltage terminal (VDL) and the fourth power source voltage terminal is a second high power source voltage terminal (VDH).

According to another aspect of the present disclosure, there is provided a data storage method in a pixel, comprising: in a first time period, a first control signal of the first control signal terminal (S1) is at its effective level, a second control signal of the second control signal terminal (S2) is at its ineffective level, the data input circuit reads the data voltage (Vdata) on the data line (DATA) onto the first data latching terminal (IN1) and the second data latching terminal (IN2), the level of the drive node (M) is opposite to that of the first data latching terminal (IN1), and the level of the output terminal (OUT) of the drive circuit is opposite to that of the data voltage; in a second time period, a second control signal of the second control signal terminal (S2) is at its effective level, a first control signal of the first control signal terminal (S1) is at its ineffective level, the data input circuit isolates the data line (DATA) from the first data latching terminal (IN1) and the second data latching terminal (IN2), the first data latching circuit holds a level of the first data latching terminal (IN1), and the second data latching circuit holds a level of the second data latching terminal (IN2), such that the level of the output terminal (OUT) of the drive circuit is held to be unchanged.

According to an embodiment of the present disclosure, in the first time period, the data voltage is at a high level, the first control signal is at the effective level, the second control signal is at the ineffective level, the first data latching terminal (IN1) and the second data latching terminal (IN2) are at the high level, the drive node (M) is at the low level, and the output terminal (OUT) of the drive circuit is at the low level; in the second time period, the first control signal is at the ineffective level, the second control signal is at the effective level, the first data latching circuit holds the first data latching terminal (IN1) to be at the high level, the second data latching circuit holds the second data latching terminal (IN2) to be at the high level, and the output terminal (OUT) of the drive circuit is held to be at the low level.

According to an embodiment of the present disclosure, in the first time period, the data voltage is at a low level, the first control signal is at the effective level, the second control signal is at the ineffective level, the first data latching terminal (IN1) and the second data latching terminal (IN2) are at the low level, the drive node (M) is at the high level, and the output terminal (OUT) of the drive circuit is at the high level; in the second time period, the first control signal is at the ineffective level, the second control signal is at the effective level, the first data latching circuit holds the first data latching terminal (IN1) to be at the low level, the second data latching circuit holds the second data latching terminal (IN2) to be at the low level, and the output terminal (OUT) of the drive circuit is held to be at the high level.

According to an embodiment of the present disclosure, in the first time period, the first control signal is at the effective level, the second control signal is at the ineffective level, the data voltage is at the high level, the first input transistor (T11) and the second input transistor (T12) are turned on such that the first data latching terminal (IN1) and the second data latching terminal (IN2) are at the high level, the first drive control transistor (T6) and the second drive control transistor (T7) are turned on such that the drive node (M) is at the low level, the first drive transistor (T1) is turned off and the second drive transistor (T2) is turned on such that the output terminal (OUT) of the drive circuit is at the low level, and the first holding transistor (T10) and the second holding transistor (T5) are turned off; in the second time period, the first control signal is at the ineffective level, the second control signal is at the effective level, the first input transistor (T11) and the second input transistor (T12) are turned off, the first control transistor (T8) of the first node is turned on and the second control transistor (T9) of the first node is turned off such that the first node (N) is at the high level, the first holding transistor (T10) is turned on such that the level of the first data latching terminal (IN1) is held to be the high level, the first control transistor (T3) of the second node is turned on and the second control transistor (T4) of the second node is turned off such that the second node (Q) is at the high level, the second holding transistor (T5) is turned on such that the level of the second data latching terminal (IN2) is held to be the high level, and the first drive transistor (T1) is held to be turned off and the second drive transistor (T2) is held to be turned on such that the output terminal (OUT) of the drive circuit is held to be at the low level.

According to an embodiment of the present disclosure, in the first time period, the first control signal is at the effective level, the second control signal is at the ineffective level, the data voltage is at the low level, the first input transistor (T11) and the second input transistor (T12) are turned on such that the first data latching terminal (IN1) and the second data latching terminal (IN2) are at the low level, the first drive control transistor (T6) is turned on and the second drive control transistor (T7) is turned off such that the drive node (M) is at the high level, the first drive transistor (T1) is turned on and the second drive transistor (T2) is turned off such that the output terminal (OUT) of the drive circuit is at the high level, and the first holding transistor (T10) and the second holding transistor (T5) are turned off; in the second time period, the first control signal is at the ineffective level, the second control signal is at the effective level, the first input transistor (T11) and the second input transistor (T12) are turned off, the first control transistor (T8) of the first node and the second control transistor (T9) of the first node are turned on such that the first node (N) is at the low level, the first holding transistor (T10) is turned on such that the level of the first data latching terminal (IN1) is held to be the low level, the first control transistor (T3) of the second node is turned off and the second control transistor (T4) of the second node is turned on such that the second node (Q) is at the low level, the second holding transistor (T5) is turned on such that the level of the second data latching terminal (IN2) is held to be the low level, the first drive transistor (T1) is held to be turned on and the second drive transistor (T2) is held to be turned off such that the output terminal (OUT) of the drive circuit is held to be at the high level.

According to an embodiment of the present disclosure, in the first time period, the first control signal is at the effective level, the second control signal is at the ineffective level, the data voltage is at the high level, the first input transistor (T11) and the second input transistor (T12) are turned on such that the first data latching terminal (IN1) and the second data latching terminal (IN2) are at the high level, the first drive control transistor (T6) is turned on and the second drive control transistor (T7) is turned off such that the drive node (M) is at the low level, the first drive transistor (T1) is turned on and the second drive transistor (T2) is turned off such that the output terminal (OUT) of the drive circuit is at the low level, and the first holding transistor (T10) and the second holding transistor (T5) are turned off; in the second time period, the first control signal is at the ineffective level, the second control signal is at the effective level, the first input transistor (T11) and the second input transistor (T12) are turned off, the first control transistor (T8) of the first node is turned on and the second control transistor (T9) of the first node is turned on such that the first node (N) is at the high level, the first holding transistor (T10) is turned on such that the level of the first data latching terminal (IN1) is held to be the high level, the first control transistor (T3) of the second node is turned off and the second control transistor (T4) of the second node is turned on such that the second node (Q) is at the high level, the second holding transistor (T5) is turned on such that the level of the second data latching terminal (IN2) is held to be the high level, the first drive transistor (T1) is held to be turned on and the second drive transistor (T2) is held to be turned off such that the output terminal (OUT) of the drive circuit is held to be at the low level.

According to the embodiments of the present disclosure, in the first time period, the first control signal is at the effective level, the second control signal is at the ineffective level, the data voltage is at the low level, the first input transistor (T11) and the second input transistor (T12) are turned on such that the first data latching terminal (IN1) and the second data latching terminal (IN2) are the low level, the first drive control transistor (T6) and the second drive control transistor (T7) are turned on such that the drive node (M) is at the high level, the first drive transistor (T1) is turned off and the second drive transistor (T2) is turned on such that the output terminal (OUT) of the drive circuit is at the high level, and the first holding transistor (T10) and the second holding transistor (T5) are turned off; in the second time period, the first control signal is at the ineffective level, the second control signal is at the effective level, the first input transistor (T11) and the second input transistor (T12) are turned off, the first control transistor (T8) of the first node is turned on and the second control transistor (T9) of the first node is turned off such that the first node (N) is at the low level, the first holding transistor (T10) is turned on such that the level of the first data latching terminal (IN1) is held to be the low level, the first control transistor (T3) of the second node is turned on and the second control transistor (T4) of the second node is turned off such that the second node (Q) is at the low level, the second holding transistor (T5) is turned on such that the level of the second data latching terminal (IN2) is held to be the low level, the first drive transistor (T1) is held to be turned off and the second drive transistor (T2) is held to be turned on such that the output terminal (OUT) of the drive circuit is held to be at the high level.

According to another aspect of the present disclosure, there is provided a pixel array, and each pixel includes an MIP according to the embodiments of the present disclosure and a liquid crystal display unit.

According to the MIP and the data storage method of the embodiments of the present disclosure, the first data latching circuit is used to hold the level of the first data latching terminal and the second data latching circuit is used to hold the level of the second data latching terminal, the level of the drive node is controlled according to the level of the first data latching terminal, the level of the drive node and the level of the second data latching terminal are opposite, then a high power source voltage or low power source voltage is output at the output terminal according to the level of the drive node and the level of the second data latching terminal, and therefore, storage of black and white voltages is realized, and further black and white display of an MIP LCD is realized. In addition, by adopting the MIP circuit of a single type of MOS transistors, a single MOS LTPS process can be applied to manufacture MIP pixels, thereby improving a product yield and reducing a production cost.

Other characteristics and advantages of the present disclosure will be illustrated in the subsequent specification, and will partially become obvious from the specification, or will be understood by implementing the present disclosure. Objects and other advantages of the present disclosure can be realized and obtained by the structures particularly specified in the specification, claims and drawings.

BRIEF DESCRIPTION OF THE DRAWINGS

The embodiments of the present disclosure will be described in detail in combination with the drawings, and the above and other objects, characteristics and advantages of the present disclosure will become more obvious. The drawings are used to provide further understanding on the embodiments of the present disclosure, constitute part of the specification and are used for explaining the present disclosure together with the embodiments of the present disclosure rather than limiting the present disclosure. In the drawings, the same reference signs generally represent the same parts or steps.

FIG. 4 is a schematic diagram of a pixel array according to an embodiment of the present disclosure;

FIG. 5 is a schematic flowchart of a data storage method in a pixel according to an embodiment of the present disclosure;

DETAILED DESCRIPTION

Figure 1:
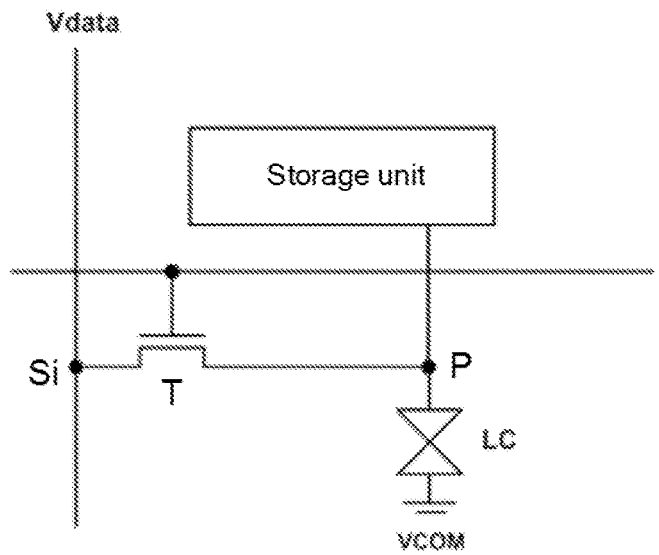
FIG. 1 is a schematic diagram of an MIP pixel circuit.

In order to clarify the objects, technical solutions and advantages of the present disclosure, the exemplary embodiments of the present disclosure will be described in detail in connection with the drawings. It is obvious that the described embodiments are just a part but not all of the embodiments of the disclosure, and those skilled in the art can obtain all other embodiment(s), without any inventive work, which should fall within the scope of the disclosure.

Herein, it needs to be noted that in the drawings, the same reference signs are endowed with the constituent parts basically having the same or similar structures and functions, and repeated description about them will be omitted.

FIG. 1 shows a schematic diagram of a traditional MIP circuit. As shown in FIG. 1, the MIP circuit includes a storage unit, a switch transistor T and a liquid crystal display unit LC, and the storage unit is formed by a latch. When the switch transistor T is turned on, data voltage Vdata is input into the storage unit, and when the switch transistor T is turned off, the storage unit holds the data voltage Vdata, and specifically holds the voltage applied to one terminal (that is, a P point) of the liquid crystal display unit LC to be unchanged.

Figure 2:
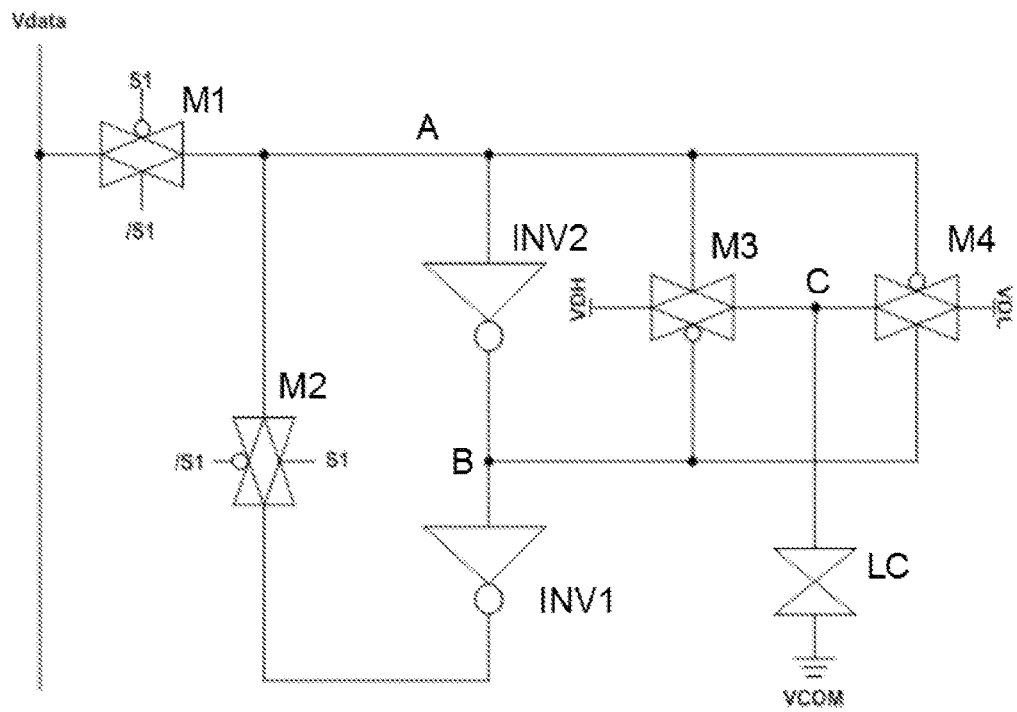
FIG. 2 is a schematic circuit diagram of an MIP formed by a CMOS circuit.

FIG. 2 shows a schematic circuit diagram of an MIP formed by a CMOS circuit.

As shown in FIG. 2, the MIP circuit includes a CMOS transmission gate M1, a CMOS transmission gate M2, a CMOS transmission gate M3, a CMOS transmission gate M4, an inverter INV1 and an inverter INV2. Such MIP circuit is a 1-bit storage unit, and can store black and white voltages, therefore, MIP pixels can realize black and white display.

When an input voltage Vdata is at a high level, and when a control signal S1 is at the low level and a control signal/S1 is at the high level, the CMOS transmission gate M1 is turned on and the CMOS transmission gate M2 is turned off, at this time, the level of an A point is also the high level and the level of a B point is the low level, such that the CMOS transmission gate M3 is turned on and the CMOS transmission gate M4 is turned off, so that a power source voltage VDH is output to a C point of the output terminal. Then when the control signal S1 becomes to be at the high level and the control signal/S1 becomes to be at the low level, the CMOS transmission gate M1 is turned off and the CMOS transmission gate M2 is turned on, the inverter INV1, the inverter INV2 and the CMOS transmission gate M2 form a holding circuit, the level of the A point holds the high level, and the power source voltage VDH is held to be output to the C point of the output terminal.

In the other aspect, when the input voltage Vdata is at the low level, and when the control signal S1 is at the low level and the control signal/S1 is at the high level, the CMOS transmission gate M1 is turned on and the CMOS transmission gate M2 is turned off, at this time, the level of the A point is also the low level and the level of the B point is the high level, such that the CMOS transmission gate M3 is turned off and the CMOS transmission gate M4 is turned on, so that a power source voltage VDL is output to the C point of the output terminal. Then when the control signal S1 becomes to be at the high level and the control signal/S1 becomes to be at the low level, the CMOS transmission gate M1 is turned off and the CMOS transmission gate M2 is turned on, the inverter INV1, the inverter INV2 and the CMOS transmission gate M2 form a holding circuit, the level of the A point holds the low level, and the power source voltage VDL is held to be output to the C point of the output terminal.

In terms of an LCD in a normal white mode, when the input voltage Vdata is at the high level, the MIP pixels display a black state, and when the input voltage Vdata is at the low level, the MIP pixels display a white state.

The MIP as shown in FIG. 2 consists of a CMOS circuit, which is based on a CMOS LTPS process, complex in process and lower in yield.

Figure 3A:
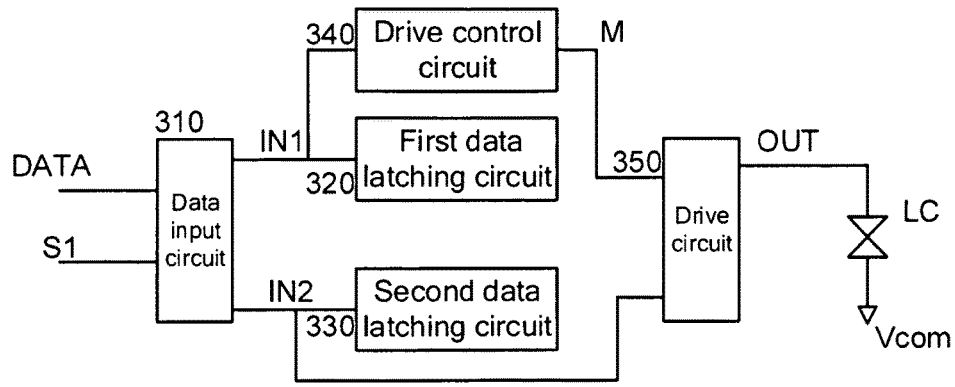
FIG. 3A is a schematic block diagram of an MIP according to an embodiment of the present disclosure.

FIG. 3A is a schematic block diagram of an MIP according to the embodiment of the present disclosure. As shown in FIG. 3A, the MIP comprises a data input circuit 310, a first data latching circuit 320, a second data latching circuit 330, a drive control circuit 340 and a drive circuit 350.

The data input unit 310 is connected to a data line DATA, a first control signal terminal S1, a first data latching terminal IN1 and a second data latching terminal IN2, and configured to read data voltage Vdata on the data line DATA onto the first data latching terminal IN1 and the second data latching terminal IN2 when a first control signal of the first control signal terminal S1 is at its effective level.

The first data latching circuit 320 is connected to the first data latching terminal IN1 and configured to hold a level of the first data latching terminal IN1.

The second data latching circuit 330 is connected to the second data latching terminal IN2 and configured to hold a level of the second data latching terminal IN2.

The drive control circuit 340 is connected to the first data latching terminal IN1 and a drive node M, and configured to enable a level of the drive node M to be opposite to that of the first data latching terminal IN1.

The drive circuit 350 is connected to the drive node M, the second data latching terminal IN2 and an output terminal OUT, and configured to output a third power source voltage of a third power source voltage terminal to the output terminal OUT when the drive node M is at its effective level and output a fourth power source voltage of a fourth power source voltage terminal to the output terminal OUT when the second data latching terminal IN2 is at its effective level.

Figure 3B:
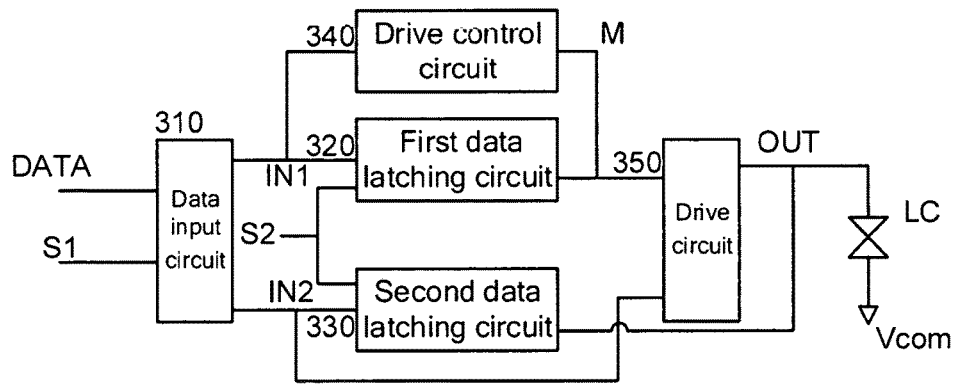
FIG. 3B is another schematic block diagram of an MIP according to an embodiment of the present disclosure.

FIG. 3B is another schematic block diagram of an MIP according to the embodiment of the present disclosure. Based on the MIP as shown in FIG. 3A, the first data latching circuit 320 is further connected to the drive node M and a second control signal terminal S2, and configured to enable the level of the first data latching terminal IN1 to be opposite to that of the drive node M when the second control signal terminal S2 is at its effective level. In addition, the second data latching circuit 330 is further connected to the output terminal OUT and the second control signal terminal S2, and configured to enable the level of the second data latching terminal IN2 to be opposite to that of the output terminal OUT when the second control signal terminal S2 is at its effective level.

Figure 3C:
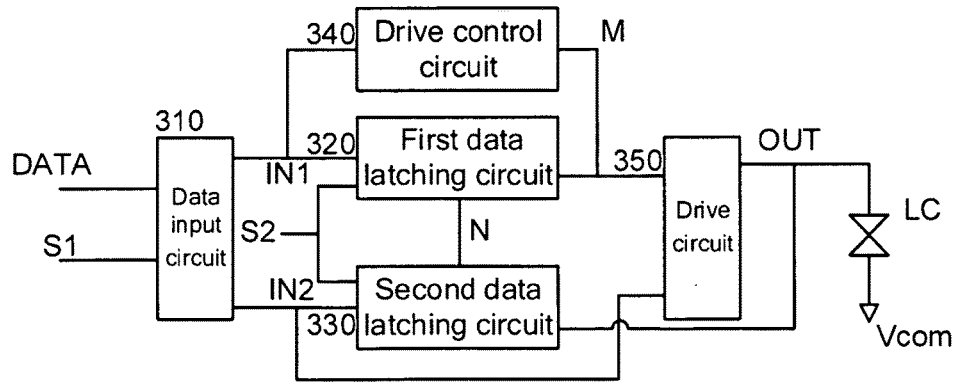
FIG. 3C is yet another schematic block diagram of an MIP according to an embodiment of the present disclosure.

FIG. 3C is yet another schematic block diagram of an MIP according to the embodiment of the present disclosure. Based on the MIP as shown in FIG. 3B, the first data latching circuit 320 is further connected to a first node N, and configured to enable a level of the first node N to be opposite to that of the drive node M. In addition, the second data latching circuit 330 is further connected to the first node N, and configured to enable a level of the second data latching terminal IN2 to be opposite to that of the output terminal OUT under control of the first node N when the second control signal terminal S2 is at its effective level.

FIG. 4 is a schematic diagram of a pixel array according to the embodiment of the present disclosure, and each pixel includes the MIP according to the embodiments of the present disclosure and a liquid crystal display unit LC.

FIG. 5 is a schematic flowchart of a data storage method in pixel according to the embodiment of the present disclosure.

In a data writing time period, the first control signal of the first control signal terminal S1 is at its effective level, the second control signal of the second control signal terminal S2 is at its ineffective level, the data input circuit 310 reads the data voltage Vdata on the data line DATA onto the first data latching terminal IN1 and the second data latching terminal IN2, the drive control circuit 340 enables the level of the drive node M to be opposite to that of the first data latching terminal IN1, and the level of the output terminal OUT of the drive circuit 350 is opposite to that of the data voltage Vdata.

In a data holding time period, the second control signal of the second control signal terminal S2 is at its effective level, the first control signal of the first control signal terminal S1 is at its ineffective level, the data input circuit 310 isolates the data line DATA from the first data latching terminal IN1 and the second data latching terminal IN2, the first data latching circuit 310 holds a level of the first data latching terminal IN1, and the second data latching circuit 320 holds a level of the second data latching terminal IN2, such that the level of the output terminal OUT of the drive circuit 350 is held to be unchanged.

According to the embodiments of the present disclosure, for an LCD in a normal white state, the input data can be divided into black state data and white state data, for example, the black state data is at the high level and the white state data is at the low level.

In a black state data writing time period, the data voltage Vdata is at the high level, the first control signal is at the effective level, the second control signal is at the ineffective level, the first data latching terminal IN1 and the second data latching terminal IN2 are at the high level, the drive node M is at the low level, and the output terminal OUT of the drive circuit is at the low level; in a black state data holding time period, the first control signal is at the ineffective level, the second control signal is at the effective level, the first data latching circuit holds the first data latching terminal IN1 to be at the high level, the second data latching circuit holds the second data latching terminal IN2 to be at the high level, and the output terminal OUT of the drive circuit is held to be at the low level.

In a white state data writing time period, the data voltage Vdata is at the low level, the first control signal is at the effective level, the second control signal is at the ineffective level, the first data latching terminal IN1 and the second data latching terminal IN2 are at the low level, the drive node M is at the high level, and the output terminal OUT of the drive circuit is at the high level; in a white state data holding time period, the first control signal is at the ineffective level, the second control signal is at the effective level, the first data latching circuit holds the first data latching terminal IN1 to be at the low level, the second data latching circuit holds the second data latching terminal IN2 to be at the low level, and the output terminal OUT of the drive circuit is held to be at the high level.

The MIP according to the embodiments of the present disclosure is formed by a single type of MOS transistors, for example, is formed only by NMOS transistors or formed only by PMOS transistors.

According to a first embodiment of the present disclosure, the MIP is formed by the NMOS transistors, and according to a second embodiment of the present disclosure, the MIP is formed by the PMOS transistors.

Figure 6A:
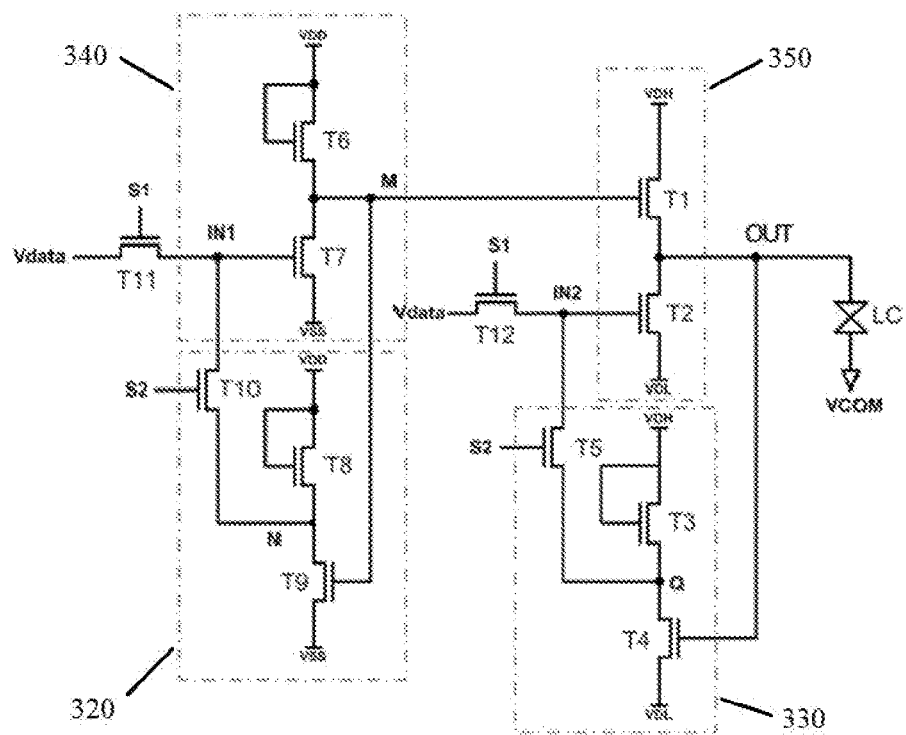
FIG. 6A is a schematic circuit diagram of the MIP as shown in FIG. 3B according to a first embodiment of the present disclosure.

FIG. 6A is a schematic circuit diagram of the MIP as shown in FIG. 3B according to the first embodiment of the present disclosure. In the first embodiment of the present disclosure, the effective levels of the first control signal and the second control signal are the high level, and the effective level of the drive node M is also the high level.

As shown in FIG. 6A, the data input circuit includes a first input transistor T11 and a second input transistor T12.

A gate electrode of the first input transistor T11 is connected to the first control signal terminal S1, a first electrode is connected to the data line DATA and a second electrode is connected to the first data latching terminal IN1. A gate electrode of the second input transistor T12 is connected to the first control signal terminal S1, a first electrode is connected to the data line DATA and a second electrode is connected to the second data latching terminal IN2.

As shown in FIG. 6A, the first data latching circuit 320 includes a first holding transistor T10, a first control transistor T8 of the first node N, and a second control transistor T9 of the first node.

A gate electrode of the first holding transistor T10 is connected to the second control signal terminal S2, a first electrode is connected to the first data latching terminal IN1 and a second electrode is connected to the first node N.

A gate electrode and a first electrode of the first control transistor T8 of the first node N are connected to a first power source voltage terminal, and a second electrode is connected to the first node N. A gate electrode of the second control transistor T9 of the first node N is connected to the drive node M, a first electrode is connected to the first node N, and a second electrode is connected to a second power source voltage terminal.

As shown in FIG. 6A, the second data latching circuit 330 includes a second holding transistor T5, a first control transistor T3 of a second node Q, and a second control transistor T4 of the second node Q.

A gate electrode of the second holding transistor T5 is connected to the second control signal terminal S2, a first electrode is connected to the second data latching terminal IN2, and a second electrode is connected to the second node Q.

A gate electrode and a first electrode of the first control transistor T3 of the second node Q are connected to a third power source voltage terminal, and a second electrode is connected to the second node Q.

A gate electrode of the second control transistor T4 of the second node Q is connected to the output terminal OUT, a first electrode is connected to the second node Q, and a second electrode is connected to a fourth power source voltage terminal.

As shown in FIG. 6A, the drive control circuit 340 includes a first drive control transistor T6 and a second drive control transistor T7.

A gate electrode and a first electrode of the first drive control transistor T6 are connected to the first power source voltage terminal, and a second electrode is connected to the drive node M.

A gate electrode of the second drive control transistor T7 is connected to the first data latching terminal IN1, a first electrode is connected to the drive node M, and a second electrode is connected to the second power source voltage terminal.

As shown in FIG. 6A, the drive circuit 350 includes a first drive transistor T1 and a second drive transistor T2.

A gate electrode of the first drive transistor T1 is connected to the drive node M, a first electrode is connected to the third power source voltage terminal, and a second electrode is connected to the output terminal OUT.

A gate electrode of the second drive transistor T2 is connected to the second data latching terminal IN2, a first electrode is connected to the output terminal OUT, and a second electrode is connected to the fourth power source voltage terminal.

According to the first embodiment of the present disclosure, each transistor is an NMOS transistor, an effective level of the drive node M is a high level, the first power source voltage terminal is a first high power source voltage terminal VDD, the second power source voltage terminal is a first low power source voltage terminal VSS, the third power source voltage terminal is a second high power source voltage terminal VDH and the fourth power source voltage terminal is a second low power source voltage terminal VDL. The first power source voltage provided by the first high power source voltage terminal VDD and the third power source voltage provided by the second high power source voltage terminal VDH can be same or different, and the second power source voltage provided by the first low power source voltage terminal VSS and the fourth power source voltage provided by the second low power source voltage terminal VDL can be same or different.

Figure 6B:
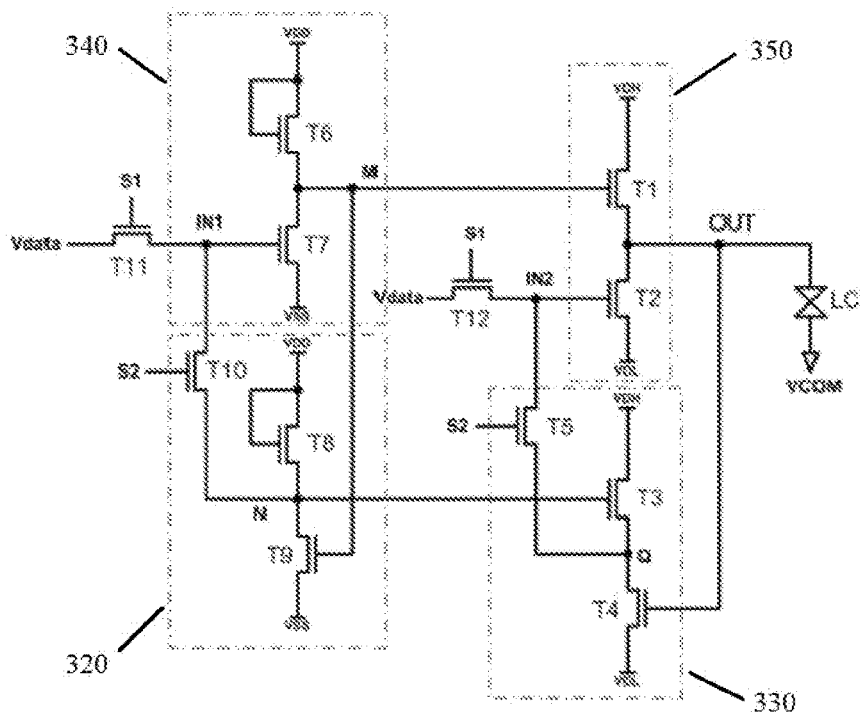
FIG. 6B is a schematic circuit diagram of the MIP as shown in FIG. 3C according to the first embodiment of the present disclosure.

FIG. 6B is a schematic circuit diagram of the MIP as shown in FIG. 3C according to the first embodiment of the present disclosure.

The schematic circuit diagram as shown in FIG. 6B differs from that as shown in FIG. 6A in a connecting manner of the first control transistor T3 of the second node Q in the second data latching circuit 330. The description on the same circuit parts in FIG. 6B as those in FIG. 6A is omitted.

As shown in FIG. 6B, the second data latching circuit is further connected to the first node N. Specifically, a gate electrode of the first control transistor T3 of the second node Q is connected to the first node N, a first electrode is connected to the third power source voltage terminal, and a second electrode is connected to the second node Q.

Figure 7:
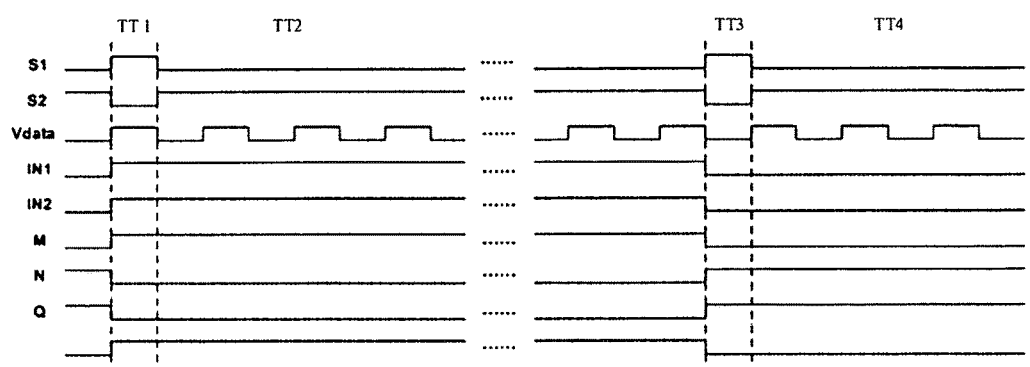
FIG. 7 is a signal timing diagram of an MIP according to an embodiment of the present disclosure.
Figure 8A:
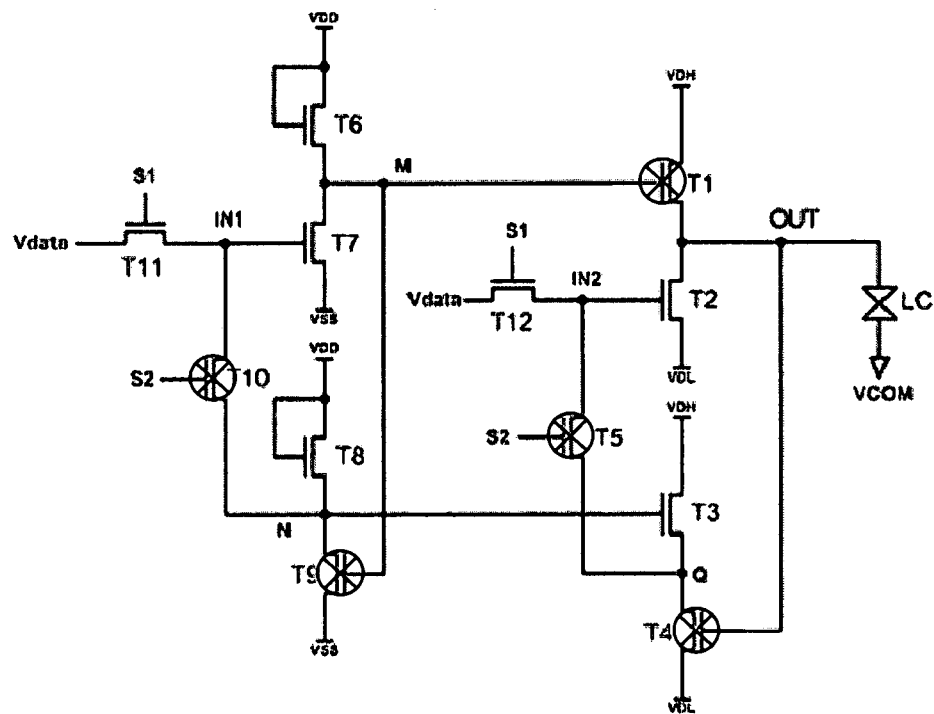
FIGS. 8A and 8B are circuit operation schematic diagrams of the MIP as shown in FIG. 6B in a case of storing black state data according to the first embodiment of the present disclosure.
Figure 8B:
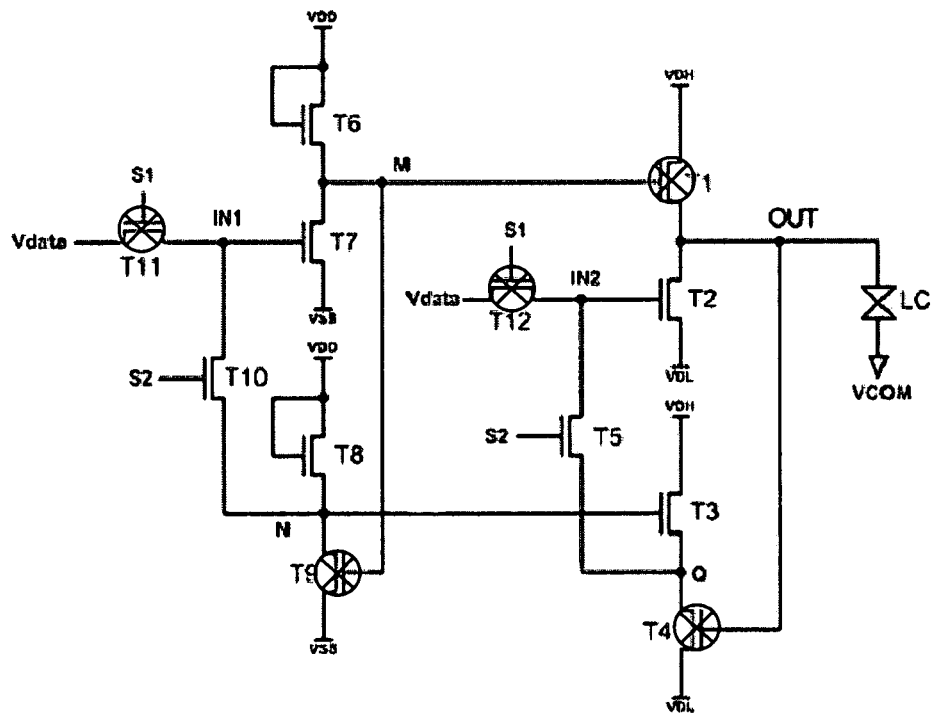
Figure 9A:
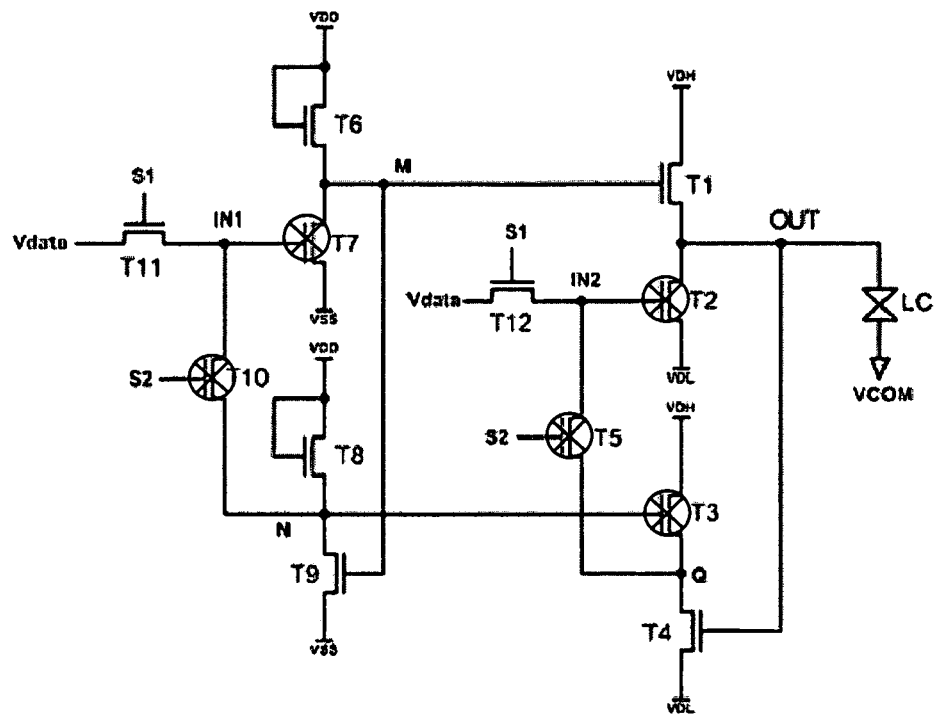
FIGS. 9A and 9B are circuit operation schematic diagrams of the MIP as shown in FIG. 6B in a case of storing white state data according to the first embodiment of the present disclosure.
Figure 9B:
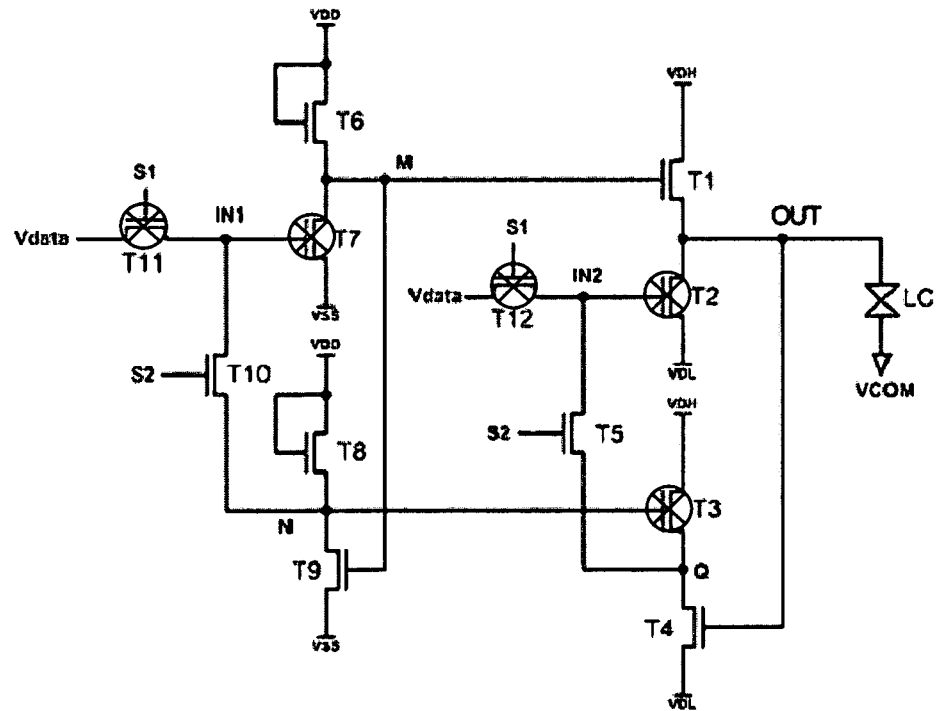

FIG. 7 is a signal timing diagram of an MIP according to the embodiment of the present disclosure, FIGS. 8A and 8B are circuit operation schematic diagrams of the MIP as shown in FIG. 6B in a case of storing black state data according to the first embodiment of the present disclosure, and FIGS. 9A and 9B are circuit operation schematic diagrams of the MIP as shown in FIG. 6B in a case of storing white state data according to the first embodiment of the present disclosure.

A data storage method in pixel as shown in FIG. 5 is specifically described in combination with FIGS. 6l, 7, 8A to 8B and 9A to 9B.

As shown in FIG. 8A, in a black state data writing time period TT1, the first control signal S1 is at the effective level (high level), the second control signal S2 is at the ineffective level (low level), the data voltage Vdata is at the high level, and the first input transistor T11 and the second input transistor T12 are turned on such that the first data latching terminal IN1 and the second data latching terminal IN2 are at the high level, the first drive control transistor T6 and the second drive control transistor T7 are turned on such that the drive node M is at the low level, the first drive transistor T1 is turned off and the second drive transistor T2 is turned on, such that the output terminal OUT of the drive circuit is at the low level, the first holding transistor T10 and the second holding transistor T5 are turned off, the second control transistor T9 of the first node N is turned off, and the second control transistor T4 of the second node Q is turned off.

As shown in FIG. 8B, in a black state data holding time period TT2, the first control signal is at the ineffective level (low level), the second control signal is at the effective level (high level), the first input transistor T11 and the second input transistor T12 are turned off, the first control transistor T8 of the first node N is turned on and the second control transistor T9 of the first node N is turned off such that the first node N is at the high level, the first holding transistor T10 is turned on such that the level of the first data latching terminal IN1 is held to be the high level, the first control transistor T3 of the second node Q is turned on and the second control transistor T4 of the second node Q is turned off such that the second node Q is at the high level, the second holding transistor T5 is turned on such that the level of the second data latching terminal IN2 is held to be the high level, the first drive transistor T1 is held to be turned off and the second drive transistor T2 is held to be turned on such that the output terminal OUT of the drive circuit is held to be at the low level.

According to the first embodiment of the present disclosure, by properly setting channel widths and lengths of the first drive control transistor T6 and the second drive control transistor T7, an on-state impedance of the first drive control transistor T6 is much greater than that of the second drive control transistor T7 when the first drive control transistor T6 and the second drive control transistor T7 are both turned on, therefore, the level of the drive node M is same as that of the second power source voltage terminal VSS.

As shown in FIG. 9A, in a white state writing time period TT3, the first control signal is at the effective level (high level), the second control signal is at the ineffective level (low level), the data voltage Vdata is at the low level, the first input transistor T11 and the second input transistor T12 are turned on such that the first data latching terminal IN1 and the second data latching terminal IN2 are at the low level, the first drive control transistor T6 is turned on and the second drive control transistor T7 is turned off such that the drive node M is at the high level, the first drive transistor T1 is turned on and the second drive transistor T2 is turned off such that the output terminal OUT of the drive circuit is at the high level, the first holding transistor T10 and the second holding transistor T5 are turned off, the second control transistor T9 of the first node N is turned on, and the second control transistor T4 of the second node Q is turned on.

As shown in FIG. 9B, in a white state data holding time period TT4, the first control signal is at the ineffective level (low level), the second control signal is at the effective level (high level), the first input transistor T11 and the second input transistor T12 are turned off, the first control transistor T8 of the first node N and the second control transistor T9 of the first node N are turned on such that the first node N is at the low level, the first holding transistor T10 is turned on such that the level of the first data latching terminal IN1 is held to be the low level, the first control transistor T3 of the second node Q is turned off and the second control transistor T4 of the second node Q is turned on such that the second node Q is at the low level, the second holding transistor T5 is turned on such that the level of the second data latching terminal IN2 is held to be the low level, the first drive transistor T1 is held to be turned on and the second drive transistor T2 is held to be turned off such that the output terminal OUT of the drive circuit is held to be at the high level.

According to the first embodiment of the present disclosure, by properly setting channel widths and lengths of the first control transistor T8 of the first node N and the second control transistor T9 of the first node N, an on-state impedance of the first control transistor T8 of the first node N is much greater than that of the second control transistor T9 of the first node N when the first control transistor T8 of the first node N and the second control transistor T9 of the first node N are both turned on, therefore, the level of the first node N is same as that of the second power source voltage terminal VSS.

According to the first embodiment of the present disclosure, regarding the circuit as shown in FIG. 6A, in the white state data writing and holding time periods, the first control transistor T3 of the second node Q and the second control transistor T4 of the second node Q are both turned on. By properly setting channel widths and lengths of the first control transistor T3 of the second node Q and the second control transistor T4 of the second node Q, an on-state impedance of the first control transistor T3 of the second node Q is much greater than that of the second control transistor T4 of the second node Q when the first control transistor T3 of the second node Q and the second control transistor T4 of the second node are both turned on, therefore, the level of the second node Q is same as that of the fourth power source voltage terminal VDL.

According to the first embodiment of the present disclosure, it should be understood that the black state data writing time period and the black state data holding time period are two continuous time periods (i.e., a first time period and a second time period) and form complete black state data writing and holding operations; and the white state writing time period and the white state data holding time period are two continuous time periods (i.e., a first time period and a second time period) and form complete white state data writing and holding operations. Although FIG. 7 shows the white state data writing and holding time periods after the black state data writing and holding time periods, it should be understood that the present disclosure is not limited thereto, and a plurality of the black state data writing and holding time periods can exist continuously, a plurality of the white state data writing and holding time periods can exist continuously, and the white state data writing and holding time periods can also appear before the black state data writing and holding time periods.

According to the first embodiment of the present disclosure, the data voltage of the black state data is Vdd, the data voltage of the white state data is Vss, the first power source voltage of the first power source voltage terminal VDD is Vdd, and the second power source voltage of the second power source voltage terminal VSS is Vss.

Due to the influences of threshold voltages, channel resistance divided voltages and the like of the transistors, an actual working high voltage and an actual working low voltage of the drive node M are not equal to Vdd and Vss but are respectively equal to VMcc and VMee. Herein, VMcc=Vdd−Vth6, VMee=(R7/(R6+R7))×(Vdd−Vss)+Vss, R7 represents a on-resistance of the transistor T7, R6 represents a on-resistance of the transistor T6, and Vth6 is a threshold voltage of the transistor T6.

Similarly, an actual working high voltage and an actual working low voltage of the first node N are not equal to Vdd and Vss but are respectively equal to VNcc and VNee. Herein, VNcc=Vdd−Vth8, VNee=(R9/(R8+R9))×(Vdd−Vss)+Vss, R9 represents a on-resistance of the transistor T9, R8 represents a on-resistance of the transistor T8, and Vth8 is a threshold voltage of the transistor T8.

In the other aspect, the third power source voltage of the third power source voltage terminal VDH is Vdh, and the fourth power source voltage of the fourth power source voltage terminal VDL is Vdl.

In order to simplify description, it is assumed that in the MIP according to the first embodiment of the present disclosure, the transistor T8 and the transistor T6 are totally same in size, the transistor T9 and the transistor T7 are totally same in size, therefore, R9=R7, R8=R6, Vth6=Vth8, in such case, the VMcc and VNcc are collectively referred to Vcc, and the VMee and VNee are collectively referred to Vee.

For white state data writing and displaying stages, when the actual working high voltage Vcc of the drive node M and the third power source voltage Vdh meet the following relationship, that is, when Vcc−Vdh>Vth1, the transistor T1 is in a saturated on-state, and Vth1 is the threshold voltage of the transistor T1. By achieving Vdh<Vdd−2Vth1, it can be ensured that the transistor T1 according to the first embodiment of the present disclosure is in the saturated on-state during the white state data writing and displaying stages, such that the output terminal OUT outputs the third power source voltage Vdh.

For the white state data writing and displaying stages, when the actual working low voltage Vee of the first node N and a low voltage Vdl at the second node Q meet the following relationship, that is, when Vee−Vdl<Vth3, only then the transistor T3 is in a off-state, and Vth3 is the threshold voltage of the transistor T3. That is to say, the condition that (R7/(R6+R7))×(Vdd−Vss)+Vss−Vdl<Vth3 needs to be met. By implementing Vdl>(R7×Vdd+R6×Vss)/(R6+R7)−Vth3, it can be ensured that the transistor T3 according to the first embodiment of the present disclosure is in the off-state during the white state data writing and displaying stages, such that the second node Q outputs the fourth power source voltage Vdl, and further the second data latching circuit can latch the voltage of the second data latching terminal IN2.

Figure 10A:
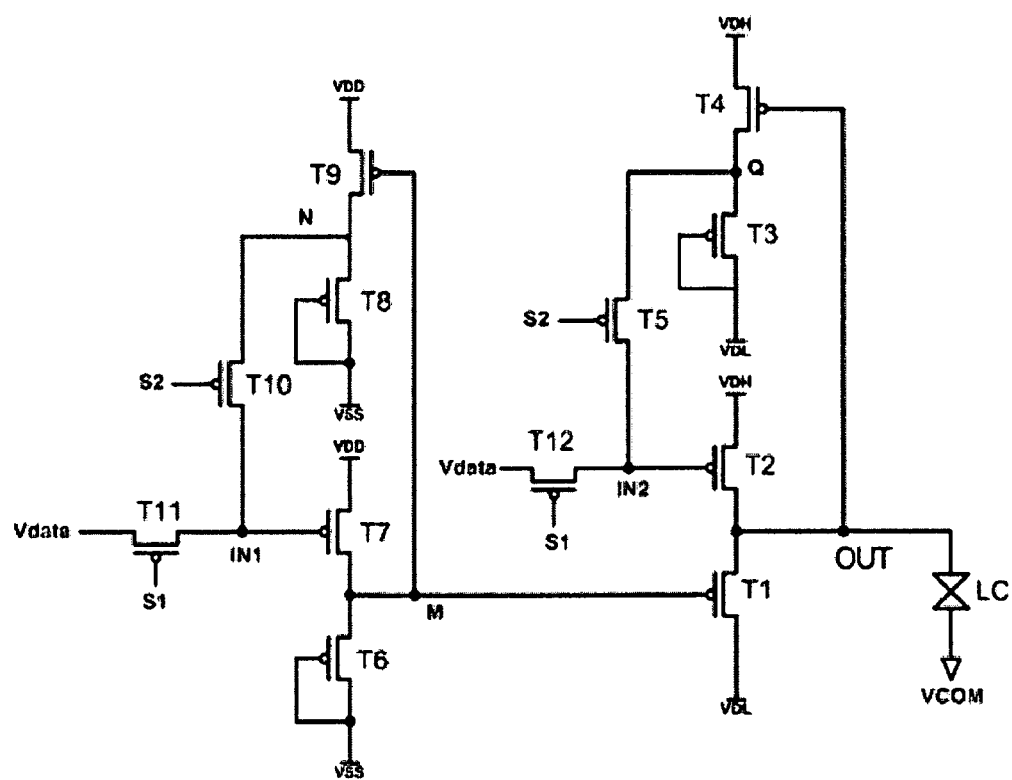
FIG. 10A is a schematic circuit diagram of the MIP as shown in FIG. 3B according to a second embodiment of the present disclosure.

FIG. 10A is a schematic circuit diagram of the MIP as shown in FIG. 3B according to the second embodiment of the present disclosure. In the second embodiment of the present disclosure, the effective levels of the first control signal and the second control signal are the low level, and the effective level of the drive node M is also the low level.

As shown in FIG. 10A, the data input circuit 310 includes a first input transistor T11 and a second input transistor T12.

A gate electrode of the first input transistor T11 is connected to the first control signal terminal S1, a first electrode is connected to the data line DATA and a second electrode is connected to the first data latching terminal IN1. A gate electrode of the second input transistor T12 is connected to the first control signal terminal S1, a first electrode is connected to the data line DATA and a second electrode is connected to the second data latching terminal IN2.

As shown in FIG. 10A, the first data latching circuit 320 includes a first holding transistor T10, a first control transistor T8 of the first node N, and a second control transistor T9 of the first node N.

A gate electrode of the first holding transistor T10 is connected to the second control signal terminal S2, a first electrode is connected to the first data latching terminal IN1 and a second electrode is connected to the first node N.

A gate electrode and a first electrode of the first control transistor T8 of the first node N are connected to a first power source voltage terminal, and a second electrode is connected to the first node N. A gate electrode of the second control transistor T9 of the first node N is connected to the drive node M, a first electrode is connected to the first node N, and a second electrode is connected to a second power source voltage terminal.

As shown in FIG. 10A, the second data latching circuit 330 includes a second holding transistor T5, a first control transistor T3 of a second node Q, and a second control transistor T4 of the second node Q.

A gate electrode of the second holding transistor T5 is connected to the second control signal terminal S2, a first electrode is connected to the second data latching terminal IN2 and a second electrode is connected to the second node Q.

A gate electrode and a first electrode of the first control transistor T3 of the second node Q are connected to the third power source voltage terminal, and a second electrode is connected to the second node Q.

A gate electrode of the second control transistor T4 of the second node Q is connected to the output terminal OUT, a first electrode is connected to the second node Q, and a second electrode is connected to the fourth power source voltage terminal.

As shown in FIG. 10A, the drive control circuit 340 includes a first drive control transistor T6 and a second drive control transistor T7.

A gate electrode and a first electrode of the first drive control transistor T6 are connected to the first power source voltage terminal, and a second electrode is connected to the drive node M.

A gate electrode of the second drive control transistor T7 is connected to the first data latching terminal IN1, a first electrode is connected to the drive node M, and a second electrode is connected to the second power source voltage terminal.

As shown in FIG. 10A, the drive circuit includes a first drive transistor T1 and a second drive transistor T2.

A gate electrode of the first drive transistor T1 is connected to the drive node M, a first electrode is connected to the third power source voltage terminal, and a second electrode is connected to the output terminal OUT.

A gate electrode of the second drive transistor T2 is connected to the second data latching terminal IN2, a first electrode is connected to the output terminal OUT, and a second electrode is connected to the fourth power source voltage terminal.

According to the second embodiment of the present disclosure, each transistor is a PMOS transistor, an effective level of the drive node M is the low level, the first power source voltage terminal is a first low power source voltage terminal VSS, the second power source voltage terminal is a first high power source voltage terminal VDD, the third power source voltage terminal is a second low power source voltage terminal VDL and the fourth power source voltage terminal is a second high power source voltage terminal VDH. The first power source voltage provided by the first low power source voltage terminal VSS and the third power source voltage provided by the second low power source voltage terminal VDL can be same or different, and the second power source voltage provided by the first high power source voltage terminal VDD and the fourth power source voltage provided by the second high power source voltage terminal VDH can be same or different.

Figure 10B:
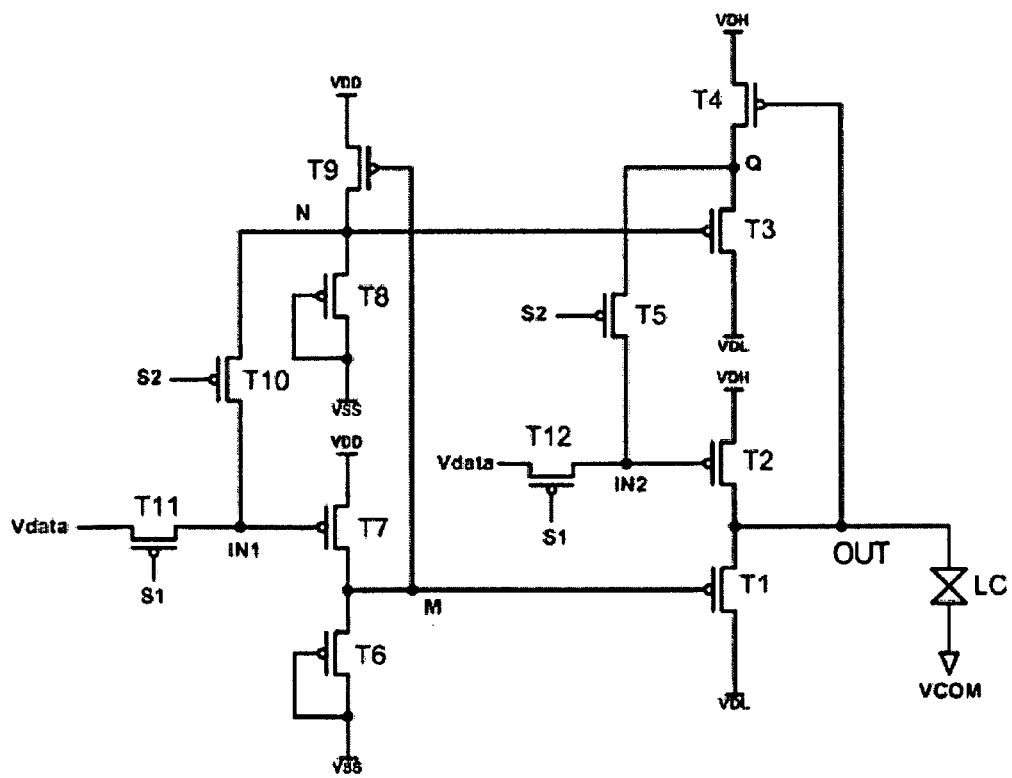
FIG. 10B is a schematic circuit diagram of the MIP as shown in FIG. 3C according to the second embodiment of the present disclosure.

FIG. 10B is a schematic circuit diagram of the MIP as shown in FIG. 3C according to the second embodiment of the present disclosure.

The schematic circuit diagram as shown in FIG. 10B differs from that as shown in FIG. 10A in a connecting manner of the first control transistor T3 of the second node Q in the second data latching circuit 330. The description on the same circuit parts in FIG. 10B as those in FIG. 10A is omitted.

As shown in FIG. 10B, the second data latching circuit is further connected to the first node N. Specifically, a gate electrode of the first control transistor T3 of the second node Q is connected to the first node N, a first electrode is connected to the third power source voltage terminal, and a second electrode is connected to the second node Q.

The data storage operation of the MIP according to the second embodiment of the present disclosure is described in combination with FIGS. 10B, 11A to 11B and 12A to 12B.

Figure 11A:
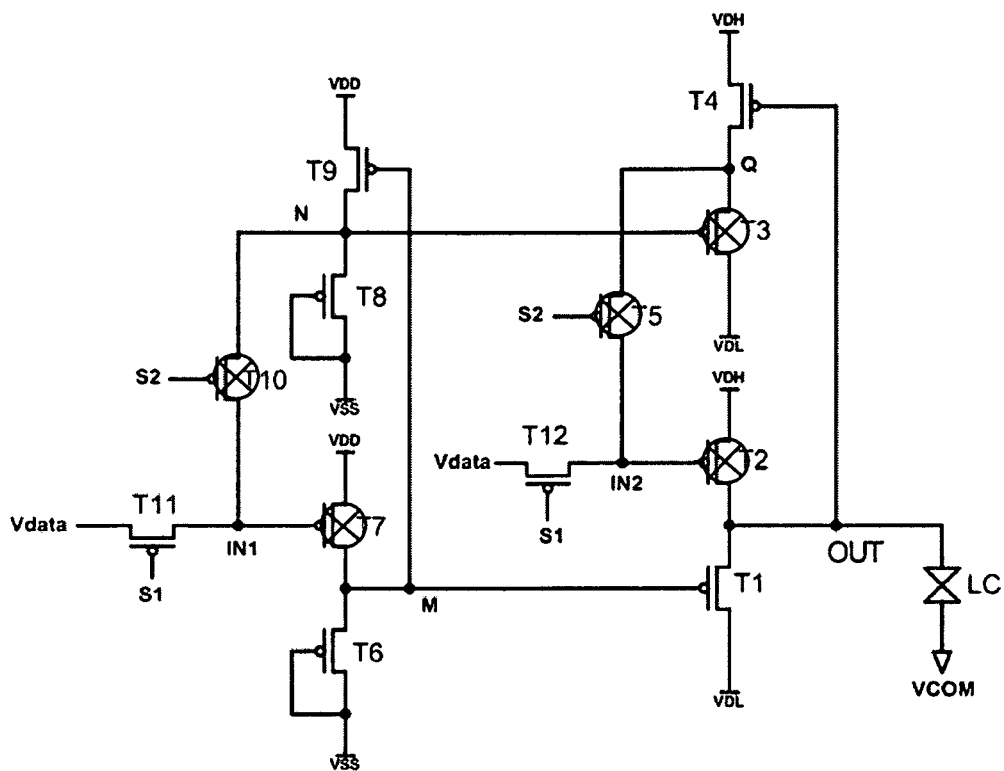
FIGS. 11A and 11B are circuit operation schematic diagrams of the MIP as shown in FIG. 10B in a case of storing black state data according to the second embodiment of the present disclosure.

As shown in FIG. 11A, in a black state data writing time period, the first control signal is at the effective level (low level), the second control signal is at the ineffective level (high level), the data voltage is the high level, and the first input transistor T11 and the second input transistor T12 are turned on such that the first data latching terminal IN1 and the second data latching terminal IN2 are at the high level, the first drive control transistor T6 is turned on and the second drive control transistor T7 is turned off such that the drive node M is at the low level, the first control transistor T8 and the second control transistor T9 of the first node N are turned on such that the first node N is at the high level, the first drive transistor T1 is turned on and the second drive transistor T2 is turned off such that the output terminal OUT of the drive circuit is at the low level, and the first holding transistor T10 and the second holding transistor T5 are turned off.

Figure 11B:
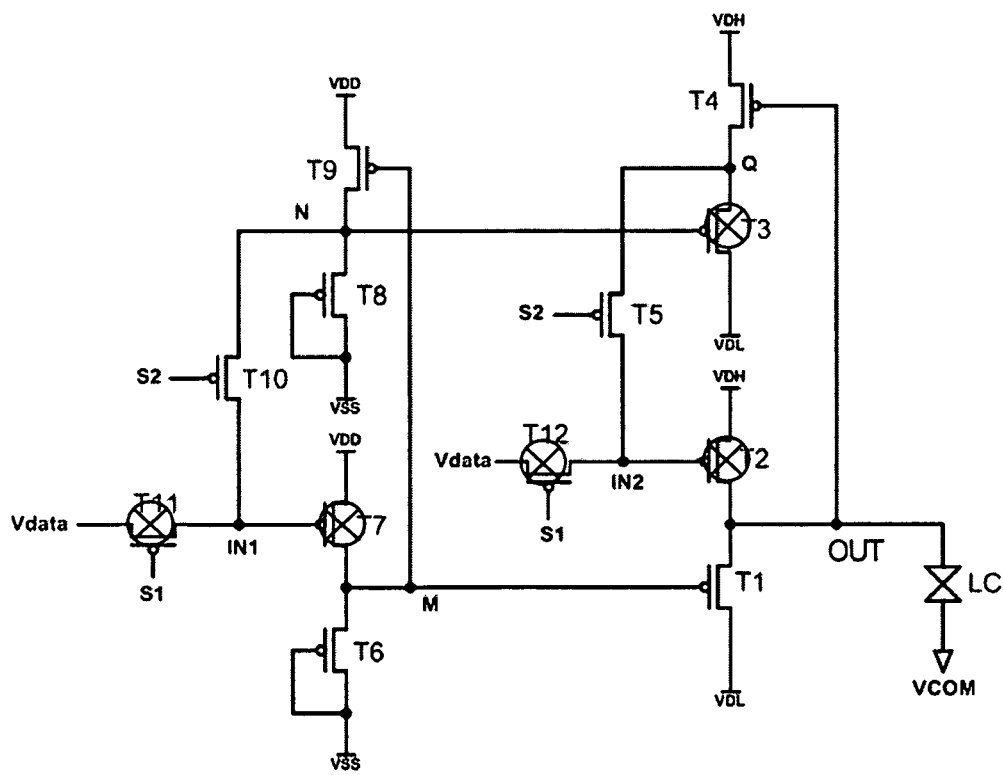

As shown in FIG. 11B, in a black state data holding time period, the first control signal is at the ineffective level (high level), the second control signal is at the effective level (low level), the first input transistor T11 and the second input transistor T12 are turned off, the first control transistor T8 of the first node N is turned on and the second control transistor T9 of the first node N is turned on such that the first node N is at the high level, the first holding transistor T10 is turned on such that the level of the first data latching terminal IN1 is held to be the high level, the first control transistor T3 of the second node Q is turned off and the second control transistor T4 of the second node Q is turned on such that the second node Q is at the high level, the second holding transistor T5 is turned on such that the level of the second data latching terminal IN2 is held to be the high level, the first drive transistor T1 is held to be turned on and the second drive transistor T2 is held to be turned off such that the output terminal OUT of the drive circuit is held to be at the low level.

According to the second embodiment of the present disclosure, by properly setting channel widths and lengths of the first control transistor T8 of the first node N and the second control transistor T9 of the first node N, an on-state impedance of the first control transistor T8 of the first node N is much greater than that of the second control transistor T9 of the first node N when the first control transistor T8 of the first node N and the second control transistor T9 of the first node N are both turned on, therefore, the level of the drive node M is the same as that of the second power source voltage terminal VDD.

Figure 12A:
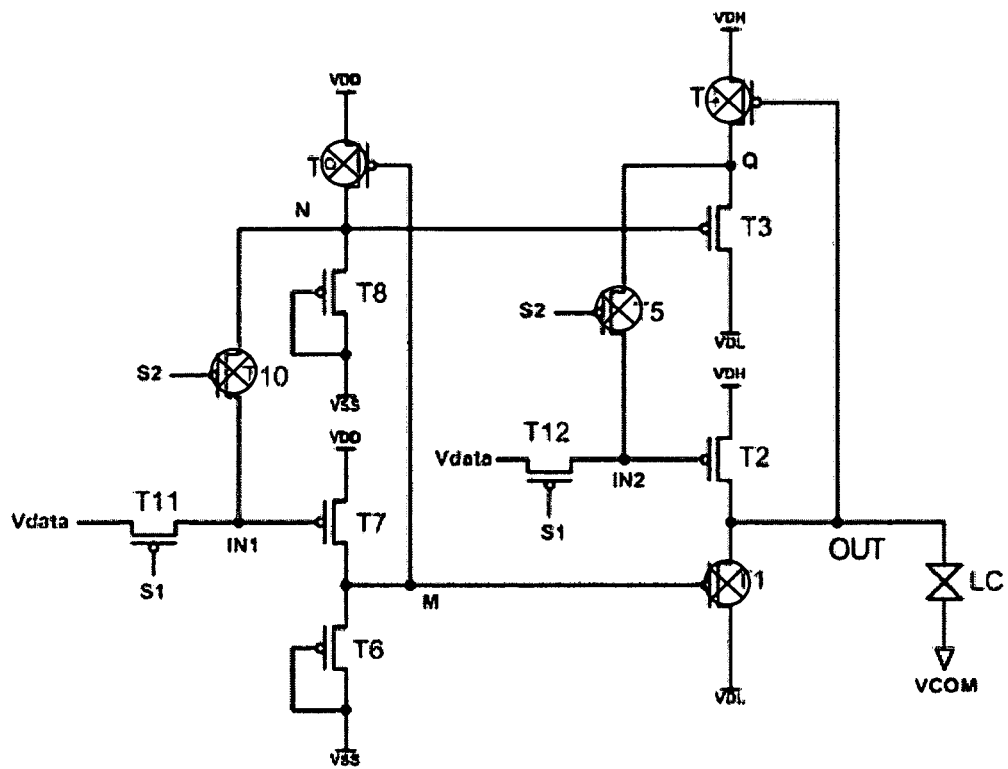
FIGS. 12A and 12B are circuit operation schematic diagrams of the MIP as shown in FIG. 10B in a case of storing white state data according to the second embodiment of the present disclosure.

As shown in FIG. 12A, in a white state data writing time period, the first control signal is at the effective level (low level), the second control signal is at the ineffective level (high level), the data voltage is at the low level, the first input transistor T11 and the second input transistor T12 are turned on such that the first data latching terminal IN1 and the second data latching terminal IN2 are at the low level, the first drive control transistor T6 and the second drive control transistor T7 are turned on such that the drive node M is at the high level, the second control transistor T9 of the first node N is turned off, the first drive transistor T1 is turned off and the second drive transistor T2 is turned on such that the output terminal OUT of the drive circuit is at the high level, the second control transistor T4 of the second node Q is turned off, and the first holding transistor T10 and the second holding transistor T5 are turned off.

Figure 12B:
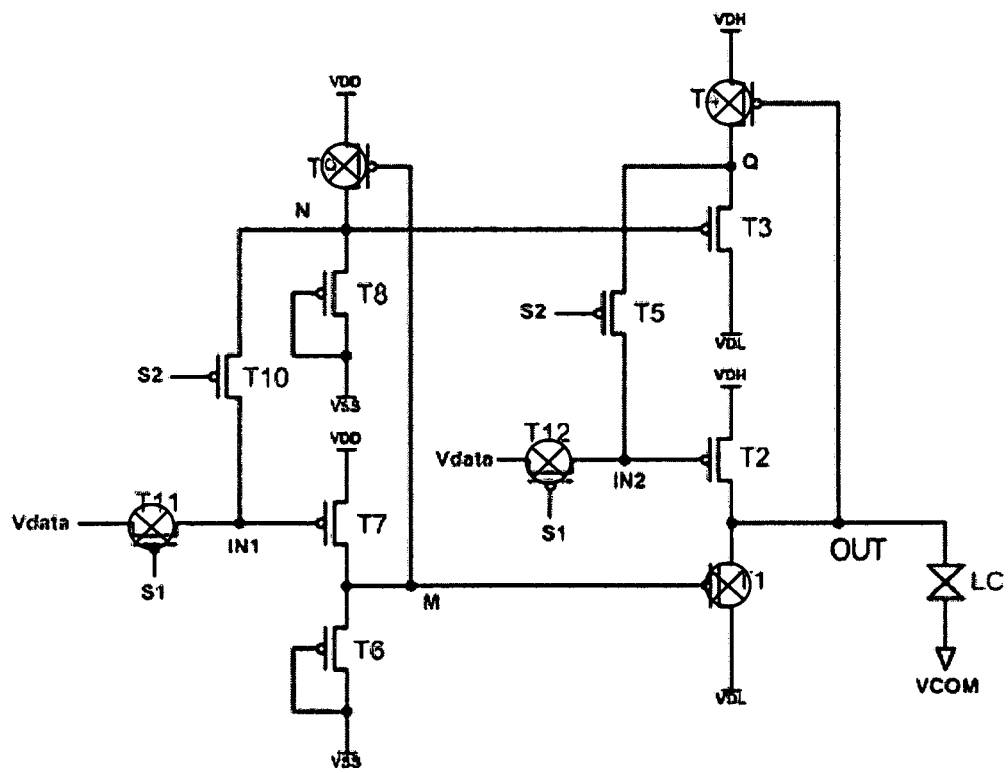

As shown in FIG. 12B, in a white state data holding time period, the first control signal is at the ineffective level (high level), the second control signal is at the effective level (low level), the first input transistor T11 and the second input transistor T12 are turned off, the first control transistor T8 of the first node is turned on and the second control transistor T9 of the first node is turned off such that the first node N is at the low level, the first holding transistor T10 is turned on such that the level of the first data latching terminal IN1 is held to be the low level, the first control transistor T3 of the second node is turned on and the second control transistor T4 of the second node is turned off such that the second node Q is at the low level, the second holding transistor T5 is turned on such that the level of the second data latching terminal IN2 is held to be the low level, the first drive transistor T1 is held to be turned off and the second drive transistor T2 is held to be turned on such that the output terminal OUT of the drive circuit is held to be at the high level.

According to the second embodiment of the present disclosure, by properly setting channel widths and lengths of the first drive control transistor T6 and the second drive control transistor T7, an on-state impedance of the first drive control transistor T6 is much greater than that of the second drive control transistor T7 when the first drive control transistor T6 and the second drive control transistor T7 are both turned on, therefore, the level of the drive node M is the same as that of the second power source voltage terminal VDD.

According to the second embodiment of the present disclosure, regarding the circuit as shown in FIG. 10A, in the black state data writing and holding time periods, the first control transistor T3 of the second node Q and the second control transistor T4 of the second node Q are both turned on. By properly setting channel widths and lengths of the first control transistor T3 of the second node Q and the second control transistor T4 of the second node Q, an on-state impedance of the first control transistor T3 of the second node Q is much greater than that of the second control transistor T4 of the second node Q when the first control transistor T3 of the second node Q and the second control transistor T4 of the second node Q are both turned on, therefore, the level of the second node Q is the same as that of the fourth power source voltage terminal VDH.

According to the second embodiment of the present disclosure, the data voltage of the black state data is Vdd, the data voltage of the white state data is Vss, the second power source voltage of the second power source voltage terminal VDD is Vdd, and the first power source voltage of the first power source voltage terminal VSS is Vss.

Due to the influences of threshold voltages, channel resistance divided voltages and the like of the transistors, an actual working high voltage and an actual working low voltage of the drive node M are not equal to Vdd and Vss but are respectively equal to VMcc and VMee. Herein, VMcc=(R6/(R6+R7))×(Vdd−Vss)+Vss, VMee=Vss+Vth6, R7 represents a on-resistance of the transistor T7, R6 represents a on-resistance of the transistor T6, Vth6 is a threshold voltage of the transistor T6, and Vth6>0.

Similarly, an actual working high voltage and an actual working low voltage of the first node N are not equal to Vdd and Vss but are respectively equal to VNcc and VNee. Herein, VNcc=(R8/(R8+R9))×(Vdd−Vss)+Vss, VMee=Vss+Vth8, R9 represents a on-resistance of the transistor T9, R8 represents a on-resistance of the transistor TB, Vth8 is a threshold voltage of the transistor T8 and Vth8>0.

In the other aspect, the third power source voltage of the third power source voltage terminal VDL is Vdl, and the fourth power source voltage of the fourth power source voltage terminal VDH is Vdh.

In order to simplify description, it is assumed that in the MIP according to the second embodiment of the present disclosure, the transistor T8 and the transistor T6 are totally same in size, the transistor T9 and the transistor T7 are totally same in size, therefore, R9=R7, R8=R6, Vth6=Vth8, in such case, the VMcc and VNcc are collectively referred to Vcc, and the VMee and VNee are collectively referred to Vee.

For black state data writing and displaying stages, when the actual working low voltage Vee of the drive node M and the third power source voltage Vdl meet the following relationship, that is, when Vee−Vdl<−Vth1, the transistor T1 is in a saturated on-state, and Vth1 is the threshold voltage of the transistor T1. It is assumed that the threshold voltage of the transistor T1 is the same as that of the transistor T6, by implementing Vdl>Vss+2Vth1, it can be ensured that the transistor T1 according to the second embodiment of the present disclosure is in the saturated on-state during the black state data writing and displaying stages, such that the output terminal OUT outputs the third power source voltage Vdl.

For the black state data writing and displaying stages, when the actual working high voltage Vcc of the first node N and a high voltage Vdh at the second node Q meet the following relationship, that is, when Vcc−Vdh>−Vth3, only then the transistor T3 is in a off-state, and Vth3 is the threshold voltage of the transistor T3. That is to say, the condition of (R8/(R8+R9))×(Vdd−Vss)+Vss−Vdh>−Vth3 needs to be met. By implementing Vdh<(R8×Vdd+R9×Vss)/(R8+R9)+Vth3, it can be ensured that the transistor T3 according to the second embodiment of the present disclosure is in the off-state during the black state data writing and displaying stages, such that the second node Q outputs the fourth power source voltage Vdh, and further the second data latching circuit can latch the voltage of the second data latching terminal IN2.

In addition, according to the embodiment of the present disclosure, there is further provided a pixel array, each pixel including the MIP according to the first embodiment of the present disclosure and a liquid crystal display unit.

In addition, according to the embodiment of the present disclosure, there is further provided a pixel array, each pixel including the MIP according to the second embodiment of the present disclosure and a liquid crystal display unit.

According to the MIP, the data storage method and the pixel array of the embodiments of the present disclosure, by adopting the single type of MOS transistors to form the MIP, the MIP can be produced by using an MOS LTPS process, and such process is relatively simple and high in yield, thereby effectively reducing a production cost of MIP pixels.

The foregoing describes respective embodiments of the present disclosure in detail. However, it can be appreciated that a person skilled in the art can make various modifications, combinations or sub-combinations to these embodiments without departing from the spirit and scope of the present disclosure, and such modifications should fall within the scope of the present disclosure.

The application claims priority of Chinese Patent Application No. 201610330824.4 titled "Memory in Pixel, Data Storage Method in Pixel and Pixel Array" filed on May 18, 2016, which is incorporated herein by reference at its entirety.

The invention claimed is:

1. A memory in pixel, comprising:
a data input circuit, connected to a data line (DATA), a first control signal terminal (S1), a first data latching terminal (IN1) and a second data latching terminal (IN2), and configured to read data voltage (Vdata) on the data line onto the first data latching terminal (IN1) and the second data latching terminal (IN2) when a first control signal of the first control signal terminal is at its effective level;
a first data latching circuit, connected to the first data latching terminal (IN1) and configured to hold a level of the first data latching terminal (IN1);
a second data latching circuit, connected to the second data latching terminal (IN2) and configured to hold a level of the second data latching terminal (IN2);
a drive control circuit, connected to the first data latching terminal (IN1) and a drive node (M) and configured to enable a level of the drive node (M) to be opposite to that of the first data latching terminal (IN1); and
a drive circuit, connected to the drive node (M), the second data latching terminal (IN2) and an output terminal (OUT), and configured to output a third power source voltage of a third power source voltage terminal to the output terminal (OUT) when the drive node (M) is at its effective level and output a fourth power source voltage of a fourth power source voltage terminal to the output terminal (OUT) when the second data latching terminal (IN2) is at its effective level.

2. The memory in pixel according to claim 1, wherein, the first data latching circuit is further connected to the drive node (M) and a second control signal terminal (S2), and configured to enable the level of the first data latching terminal (IN1) to be opposite to that of the drive node (M) when the second control signal terminal (S2) is at its effective level; and
the second data latching circuit is further connected to the output terminal (OUT) and the second control signal terminal (S2), and further configured to enable the level of the second data latching terminal (IN2) to be opposite to that of the output terminal (OUT) when the second control signal terminal (S2) is at its effective level.

3. The memory in pixel according to claim 2, wherein, the first data latching circuit includes:
a first holding transistor (T10), having a gate electrode connected to the second control signal terminal (S2), a first electrode connected to the first data latching terminal (IN1) and a second electrode connected to a first node (N);
a first control transistor (T8) of the first node, having a gate electrode and a first electrode connected to a first power source voltage terminal, and a second electrode connected to the first node (N); and
a second control transistor (T9) of the first node, having a gate electrode connected to the drive node (M), a first electrode connected to the first node (N), and a second electrode connected to a second power source voltage terminal.

4. The memory in pixel according to claim 3, wherein, the second data latching circuit includes:
a second holding transistor (T5), having a gate electrode connected to the second control signal terminal (S2), a first electrode connected to the second data latching terminal (IN2) and a second electrode connected to a second node (Q);
a first control transistor (T3) of the second node, having a gate electrode and a first electrode connected to the third power source voltage terminal, and a second electrode connected to the second node (Q); and
a second control transistor (T4) of the second node, having a gate electrode connected to the output terminal (OUT), a first electrode connected to the second node (Q), and a second electrode connected to the fourth power source voltage terminal.

5. The memory in pixel according to claim 3, wherein, the second data latching circuit is further connected to the first node (N), and the second data latching circuit includes:
a second holding transistor (T5), having a gate electrode connected to the second control signal terminal (S2), a first electrode connected to the second data latching terminal (IN2) and a second electrode connected to the second node (Q);
a first control transistor (T3) of the second node, having a gate electrode connected to the first node (N), a first electrode connected to the third power source voltage terminal, and a second electrode connected to the second node (Q); and
a second control transistor (T4) of the second node, having a gate electrode connected to the output terminal (OUT), a first electrode connected to the second node (Q), and a second electrode connected to the fourth power source voltage terminal.

6. The memory in pixel according to claim 4, wherein, the data input circuit includes:
a first input transistor (T11), having a gate electrode connected to the first control signal terminal (S1), a first electrode connected to the data line (DATA) and a second electrode connected to the first data latching terminal (IN1); and a second input transistor (T12), having a gate electrode connected to the first control signal terminal (S1), a first electrode connected to the data line (DATA) and a second electrode connected to the second data latching terminal (IN2).

7. The memory in pixel according to claim 5, wherein, the data input circuit includes:
   a first input transistor (T11), having a gate electrode connected to the first control signal terminal (S1), a first electrode connected to the data line (DATA) and a second electrode connected to the first data latching terminal (IN1); and
   a second input transistor (T12), having a gate electrode connected to the first control signal terminal (S1), a first electrode connected to the data line (DATA) and a second electrode connected to the second data latching terminal (IN2).

8. The memory in pixel according to claim 6, wherein, the drive control circuit includes:
   a first drive control transistor (T6), having a gate electrode and a first electrode connected to the first power source voltage terminal, and a second electrode connected to the drive node (M); and
   a second drive control transistor (T7), having a gate electrode connected to the first data latching terminal (IN1), a first electrode connected to the drive node (M), and a second electrode connected to the second power source voltage terminal.

9. The memory in pixel according to claim 7, wherein, the drive control circuit includes:
   a first drive control transistor (T6), having a gate electrode and a first electrode connected to the first power source voltage terminal, and a second electrode connected to the drive node (M); and
   a second drive control transistor (T7), having a gate electrode connected to the first data latching terminal (IN1), a first electrode connected to the drive node (M), and a second electrode connected to the second power source voltage terminal.

10. The memory in pixel according to claim 8, wherein, the drive circuit includes:
    a first drive transistor (T1), having a gate electrode connected to the drive node (M), a first electrode connected to the third power source voltage terminal, and a second electrode connected to the output terminal (OUT); and
    a second drive transistor (T2), having a gate electrode connected to the second data latching terminal (IN2), a first electrode connected to the output terminal (OUT), and a second electrode connected to the fourth power source voltage terminal.

11. The memory in pixel according to claim 9, wherein, the drive circuit includes:
    a first drive transistor (T1), having a gate electrode connected to the drive node (M), a first electrode connected to the third power source voltage terminal, and a second electrode connected to the output terminal (OUT); and
    a second drive transistor (T2), having a gate electrode connected to the second data latching terminal (IN2), a first electrode connected to the output terminal (OUT), and a second electrode connected to the fourth power source voltage terminal.

12. The memory in pixel according to claim 10, wherein, each transistor is an NMOS transistor, an effective level of the drive node (M) is a high level, the first power source voltage terminal is a first high power source voltage terminal (VDD), the second power source voltage terminal is a first low power source voltage terminal (VSS), the third power source voltage terminal is a second high power source voltage terminal (VDH) and the fourth power source voltage terminal is a second low power source voltage terminal (VDL).

13. The memory in pixel according to claim 11, wherein, each transistor is an NMOS transistor, an effective level of the drive node (M) is a high level, the first power source voltage terminal is a first high power source voltage terminal (VDD), the second power source voltage terminal is a first low power source voltage terminal (VSS), the third power source voltage terminal is a second high power source voltage terminal (VDH) and the fourth power source voltage terminal is a second low power source voltage terminal (VDL).

14. The memory in pixel according to claim 10, wherein, each transistor is a PMOS transistor, an effective level of the drive node (M) is a low level, the first power source voltage terminal is a first low power source voltage terminal (VSS), the second power source voltage terminal is a first high power source voltage terminal (VDD), the third power source voltage terminal is a second low power source voltage terminal (VDL) and the fourth power source voltage terminal is a second high power source voltage terminal (VDH).

15. The memory in pixel according to claim 11, wherein, each transistor is a PMOS transistor, an effective level of the drive node (M) is a low level, the first power source voltage terminal is a first low power source voltage terminal (VSS), the second power source voltage terminal is a first high power source voltage terminal (VDD), the third power source voltage terminal is a second low power source voltage terminal (VDL) and the fourth power source voltage terminal is a second high power source voltage terminal (VDH).

16. A data storage method in a pixel, wherein the pixel includes the memory in pixel according to claim 1 and a liquid crystal display unit, and the data storage method comprises:
    in a first time period, a first control signal of the first control signal terminal (S1) is at its effective level, a second control signal of the second control signal terminal (S2) is at its ineffective level, the data input circuit reads the data voltage (Vdata) on the data line (DATA) onto the first data latching terminal (IN1) and the second data latching terminal (IN2), the level of the drive node (M) is opposite to that of the first data latching terminal (IN1), and the level of the output terminal (OUT) of the drive circuit is opposite to that of the data voltage; and
    in a second time period, a second control signal of the second control signal terminal (S2) is at its effective level, a first control signal of the first control signal terminal (S1) is at its ineffective level, the data input circuit isolates the data line (DATA) from the first data latching terminal (IN1) and the second data latching terminal (IN2), the first data latching circuit holds a level of the first data latching terminal (IN1), and the second data latching circuit holds a level of the second data latching terminal (IN2), such that the level of the output terminal (OUT) of the drive circuit is held to be unchanged.

17. A pixel array, wherein each pixel includes a memory in pixel according to claim 1 and a liquid crystal display unit.

* * * * *